(12) United States Patent
Muthukumar et al.

(10) Patent No.: US 12,342,260 B2
(45) Date of Patent: Jun. 24, 2025

(54) ADVERTISEMENT OF SUPPORTED IP VERSION BY PACKET ROUTING NODES

(71) Applicant: T-Mobile USA, Inc., Bellevue, WA (US)

(72) Inventors: Praveen Singaram Muthukumar, Lawrenceville, NJ (US); Rahul Pal, Bellevue, WA (US); Rushabhkumar Patel, Newcastle, WA (US); Kameswaran Arunachalam, Redmond, WA (US); Karunakalage Viraj Rakitha Silva, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 544 days.

(21) Appl. No.: 17/744,496

(22) Filed: May 13, 2022

(65) Prior Publication Data
US 2023/0370946 A1 Nov. 16, 2023

(51) Int. Cl.
*H04W 40/24* (2009.01)
*H04W 80/04* (2009.01)

(52) U.S. Cl.
CPC ........ *H04W 40/248* (2013.01); *H04W 80/045* (2013.01)

(58) Field of Classification Search
CPC .............. H04W 40/248; H04W 80/045
See application file for complete search history.

(56) References Cited

U.S. PATENT DOCUMENTS

2020/0359440 A1* 11/2020 Qiao .................. H04W 76/15
2020/0366642 A1* 11/2020 Zong ................. H04L 61/5007

* cited by examiner

*Primary Examiner* — Michael Thier
*Assistant Examiner* — Tracy Lauren Colbert
(74) *Attorney, Agent, or Firm* — Foley IP Law, PLLC

(57) ABSTRACT

Solutions for providing a data traffic session for a user equipment (UE) over a wireless network comprises: receiving, by a session management node (e.g., a session management function, SMF), for a packet routing node (e.g., a user plane function, UPF), an indication of supported interne protocol (IP) traffic type (e.g., IPv4 or IPv6), wherein the indication of supported IP traffic type indicates support for a first IP traffic type or support for a second IP traffic type; allocating, by the session management node, to the packet routing node, a set of IP addresses based on at least the indication of supported IP traffic types, wherein allocating the set of IP addresses comprises allocating only supported IP addresses and withholding allocation of unsupported IP addresses; and providing, to the UE, using an IP address of the set of IP addresses, the data traffic session through the packet routing node.

18 Claims, 5 Drawing Sheets

ADVERTISEMENT OF SUPPORTED IP VERSION BY PACKET ROUTING NODES

BACKGROUND

When a cellular device, such as a user equipment (UE), sends and receives internet protocol (IP) traffic, it requires an IP address. The wireless network that is serving the UE will assign an IP address to the UE upon request. The cellular network has a pool of IP addresses which is used to service the UEs on the network, by assigning IP addresses as needed. A 3GPP technical standard (TS) 29.244, which is also provides as a parallel standard, ETSI TS 129.244, states in Section 5.21.1 that "A given IP address pool shall be controlled by a unique entity (either the SMF/PGW-C or the UPF/PGW-U or an external server)."

In practice, a fifth generation cellular (5G) session management function (SMF) or a fourth generation cellular (4G) packet data network gateway (PGW)-control plane (PGW-C) holds a pool of IP addresses (e.g., has a reserved range of IP address numbers awaiting assignment) and stages sets of those IP addresses, at various 5G user plane functions (UPFs) or 4G PGW-user planes (PGW-Us), for assignment to UEs that will later use one of those UPFs or PGW-Us (together, "packet routing nodes").

However, there are currently two types of IP addresses: the older IPv4 address type is 32-bits long and the newer IPv6 address type is at least 128-bits long. Some UEs use IPv4, and some UEs use IPv6 (dual stack UEs can use both IPv4 and IPv6, which is often referred to as IPv4v6). A wireless network does not know a priori which UEs will use which packet routing node, and so typically stages sets of both IPv4 and IPv6 address types at each packet routing node. Unfortunately, when a packet routing node does not support IP traffic of one of those IP traffic types (e.g., the packet routing node is designated to support only Iv4 or IPv6 traffic), even though the packet routing node has an IP address available for assignment, the packet routing node will not handle the packet data session traffic. The UE will be instructed to use a different packet routing node. The unsupported IP addresses, that had been assigned from the pool at the SMF or PGW-C (together, "session management node"), are thus wasted for that packet routing node.

SUMMARY

The following summary is provided to illustrate examples disclosed herein, but is not meant to limit all examples to any particular configuration or sequence of operations.

Solutions for providing a data traffic session for a user equipment (UE) over a wireless network comprises: receiving, by a session management node of the wireless network, for a first packet routing node of the wireless network, a first indication of supported internet protocol (IP) traffic type, wherein the first indication of supported IP traffic type indicates support for a first IP traffic type or support for a second IP traffic type different from the first IP traffic type; allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses; and providing, to the UE, using an IP address of the first set of IP addresses, the data traffic session through the first packet routing node.

BRIEF DESCRIPTION OF THE DRAWINGS

The disclosed examples are described below with reference to the accompanying drawing figures listed below, wherein.

Figure 1:
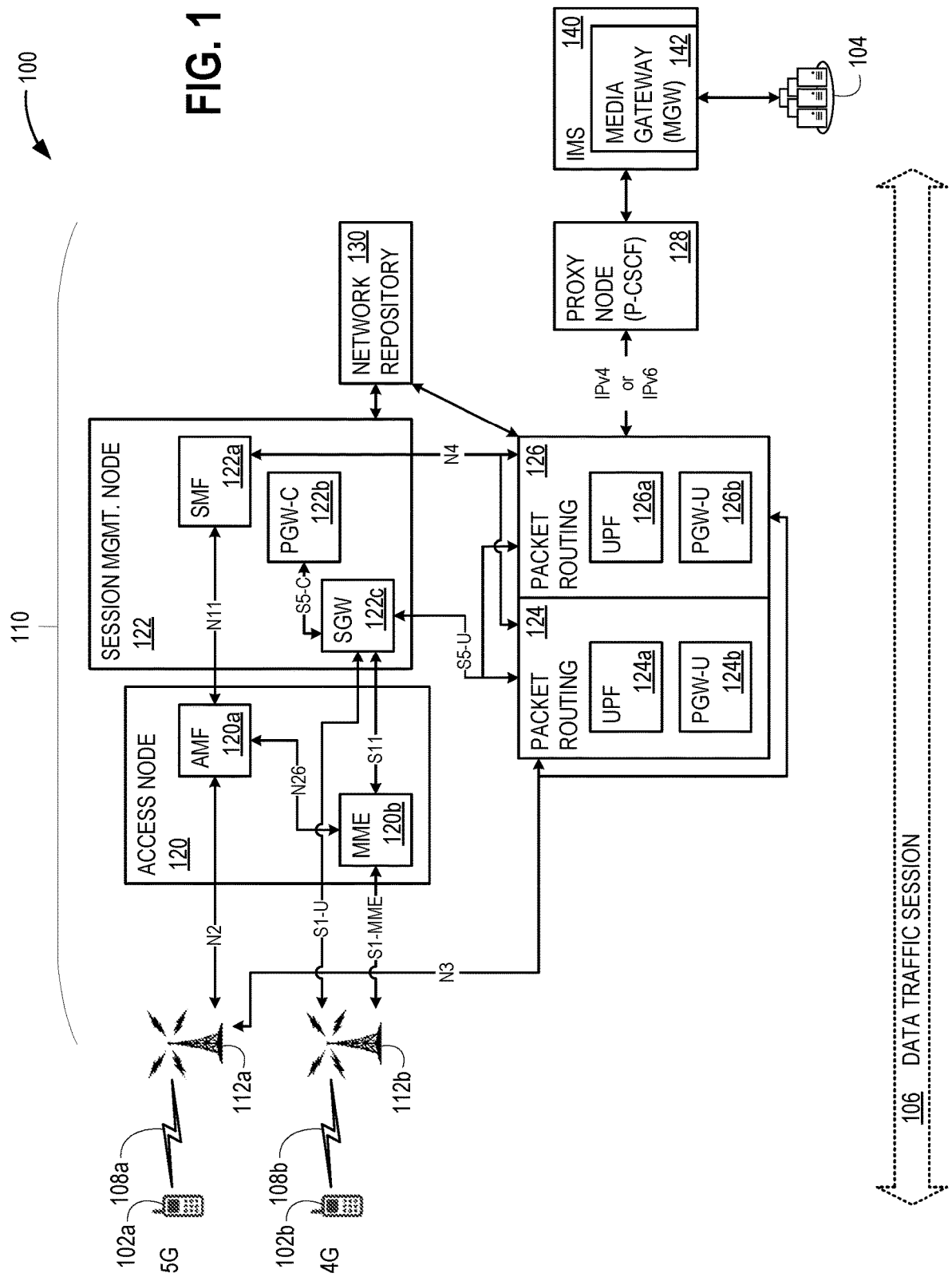
FIG. 1 illustrates an exemplary arrangement that advantageously employs advertisement of supported internet protocol (IP) version by packet routing nodes.

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for providing a data traffic session for a user equipment (UE) over a wireless network comprises: receiving, by a session management node of the wireless network, for a first packet routing node of the wireless network, a first indication of supported internet protocol (IP) traffic type (e.g. IPv4 or IPv6), wherein the first indication of supported IP traffic type indicates support for a first IP traffic type or support for a second IP traffic type different from the first IP traffic type; allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses; and providing, to the UE, using an IP address of the first set of IP addresses, the data traffic session through the first packet routing node.

The wireless network may be a fifth generation cellular (5G) wireless network or a fourth generation cellular (4G) wireless network; the session management node may be session management function (SMF) or a packet data network gateway (PGW)-control plane (PGW-C), and the first packet routing node may be a user plane function (UPF) or a (PGW-U). Requests for allocation of additional IP addresses by the first packet routing node are also made in accordance with the first indication of supported IP traffic type (e.g., the session management node is able to use that first indication of supported IP traffic type for initial and subsequent allocation of IP addresses to the first packet routing node).

A packet routing node supports an IP traffic type if it is able to handle the IP addresses (e.g., IPv4 addresses or IPv6 addresses) and is configured to do so. If the packet routing node cannot handle a particular IP address—or even if it is able to handle that particular IP address, but network slicing routes that type of traffic away—the IP traffic type corresponding to that IP address is unsupported. That is, some packet routing nodes do not support an IP traffic type due to network slicing, rather than capability.

Allocation of IP addresses to a second packet routing node that supports a different IP traffic type is made in accordance with a second indication of supported IP traffic type for the second packet routing node. That is, the session management node allocates IP addresses to each the first and second packet routing nodes based on each node's supported IP traffic type, rather than allocating the same mix (e.g., both IPv4 and IPv6 IP addresses) to both packet routing nodes.

Aspects of the disclosure thus improve the efficiency of wireless network operations by allocating (to a packet routing node) only supported IP addresses and withholding allocation of unsupported IP addresses. This avoids the wireless network wasting its allotment of IP addresses on packet routing nodes that will not employ them for supporting UE data traffic sessions.

With reference now to the figures, FIG. 1 illustrates an arrangement 100 that advantageously employs advertisement of supported IP version(s) by packet routing nodes 124 and 126. In arrangement 100, a wireless network 110 provides a data traffic session 106 for UE 102a, for example a data packet session with a packet data network 104. UE 102a communicates with a 5G base station 112a of wireless network 110 using an air interface 108a. Signaling for setting up data traffic session 106 passes from base station 112a through an access node 120 to a session management node 122. Data packets of data traffic session 106 pass from base station 112a through a packet routing node 124 and a proxy node 128 to an internet protocol (IP) multimedia system (IMS) 140, which has a media gateway (MGW) 142. Further networks may be used to connect MGW 142 to packet data network 104.

In some examples, wireless network 110 may comprise a 4G wireless network, a 5G wireless network, or another wireless network. For 5G aspects of wireless network 110, base station 112a may comprise a gNodeB (gNB), access node 120 may comprise an access and mobility management function (AMF) 120a, session management node 122 may comprise a session management function (SMF), 122a, packet routing node 124 may comprise a user plane function (UPF) 124a, and packet routing node 126 may comprise a UPF 126a. For 4G aspects of wireless network 110, base station 112b may comprise an eNodeB (eNB) serving a 4G UE 104b over an air interface 108b, access node 120 may comprise a mobility management entity (MME) 120b, and session management node 122 may comprise a packet data network gateway (PGW) control plane function (PGW-C) 122b and a serving gateway (SGW) 122c, packet routing node 124 may comprise a PGW user plane function (PGW-U) 124b, and packet routing node 126 may comprise a PGW-U 126b.

In some examples, proxy node 128 comprises a proxy-call session control function (P-CSCF). From packet routing node 124, through proxy node 128 and on to packet data network 104, data traffic session will use one of two IP traffic types: Ipv4 or IPv6. Wireless network 110 also comprises a network repository 130, which in some examples comprises a network repository function (NRF). In some examples, wireless network 110 may have only 5G or only 4G components deployed in some region.

Figure 2:
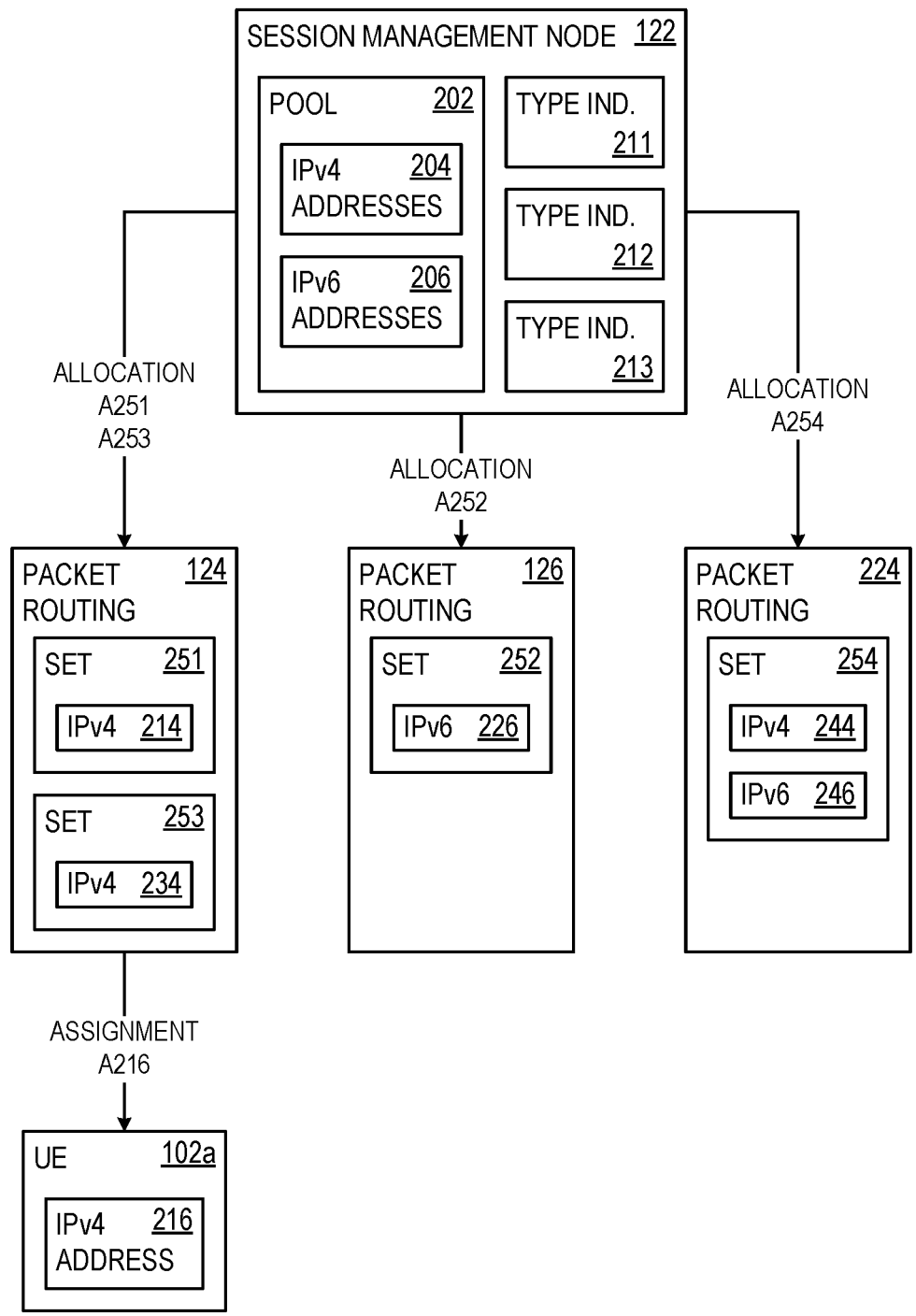
FIG. 2 illustrates allocation and assignment of IP addresses from a pool, as may occur in examples of the arrangement of FIG. 1.

FIG. 2 illustrates allocation and assignment of IP addresses from a pool 202 in session management node 122. Pool 202 is illustrated as having both a set of IPv4 addresses 204 and a set of IPv6 addresses 206 that are available for allocation to packet routing nodes, such as first packet routing node 124, second packet routing node 126, and a third packet routing node 224.

A first indication of supported IP traffic type 211, for packet routing node 124, indicates that packet routing node 124 supports only IPv4. IPv6 is unsupported by packet routing node 124. A second indication of supported IP traffic type 212, for packet routing node 126, indicates that packet routing node 126 supports only IPv6. IPv4 is unsupported by packet routing node 126. A third indication of supported IP traffic type 213, for packet routing node 224, indicates that packet routing node 224 supports both IPv4 and IPv6.

Session management node 122 allocates a set 251 of IP addresses 214 (only IPv4 addresses) to packet routing node 124, based on at least indication of supported IP traffic type 211, using an allocation A251. Allocation A251 allocates only supported IPv4 addresses and withholds allocation of unsupported IPv6 addresses. UE 102a requests an IP address and is assigned an IP address 216 (IPv4) from set 251. When packet routing node 124 requests additional IP addresses, session management node 122 already has indication of supported IP traffic type 211, and uses indication of supported IP traffic type 211 to allocate another set 253 of IP addresses 234 (only IPv4 addresses) to packet routing node 124, using an allocation A253.

Session management node 122 allocates a set 252 of IP addresses 226 (only IPv6 addresses) to packet routing node 126, based on at least indication of supported IP traffic type 212, using an allocation A252. Allocation A252 allocates only supported IPv6 addresses and withholds allocation of unsupported IPv4 addresses. Session management node 122 allocates a set 254 of both IP addresses 244 (IPv4 addresses) and IP addresses 246 (IPv6 addresses) to packet routing node 224, based on at least indication of supported IP traffic type 213, using an allocation A254. Allocation A254 allocates supported IPv4 and IPv6 addresses.

Figure 3:
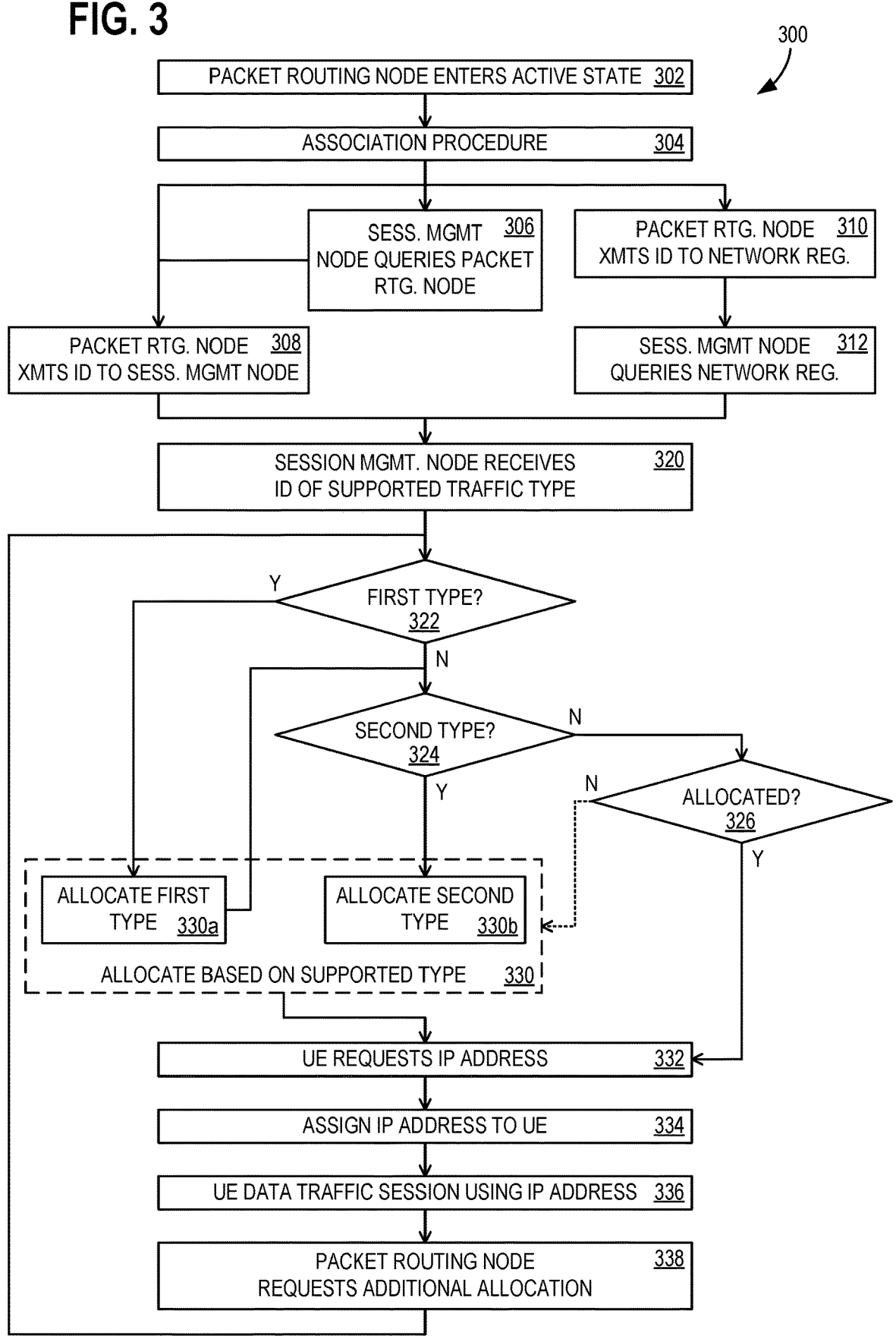
FIG. 3 shows a flowchart of exemplary operations associated with the arrangement of FIG. 1.

FIG. 3 illustrates a flowchart 300 of exemplary operations associated with providing data traffic session 106 for UE 102 over wireless network 110. In some examples, at least a portion of flowchart 300 may be performed using one or more computing devices 500 of FIG. 5. In some examples, wireless network 110 comprises a 4G cellular network and/or a 5G cellular network. In some examples, data traffic session 106 comprises a packet data session (other than a voice session).

Flowchart 300 commences with packet routing node 124 entering an active state at 302. When packet routing nodes 126 and 224 also enter an active state, this kicks off flowchart 300 at 302 for those packet routing nodes. A Packet Forwarding Control Protocol (PFCP) procedure, described in Section 5.8 of 3GPP technical standard (TS) 29.244 (and also ETSI 129.244) is performed as part of operation 304.

Flowchart 300 has three optional paths: via operation 306 to operation 308 and then to operation 320, directly to operation 308 (bypassing operation 306) and then to operation 320, or through operations 310 and 312 to operation 320.

In operation 306, session management node 122 queries packet routing node 124 for indication of supported IP traffic type 211. Session management node 122 also queries packet routing node 126 for indication of supported IP traffic type 212 and queries packet routing node 224 for indication of supported IP traffic type 213. In operation 308, packet routing node 124 transmits indication of supported IP traffic type 211 to session management node 122. Additionally, packet routing nodes 126 and 224 transmit indications of supported IP traffic type 212 and 213 to session management node 122.

If flowchart 300 enters operation 308 via operation 306, this transmitting is based on at least receiving the query of operation 306. Otherwise, if packet routing nodes 124, 126, and 224 transmit their respective indications of supported IP traffic type automatically, based on coming into an active state, flowchart 300 enters operation 308 directly and operation 306 is not needed. In some examples, packet routing nodes 124, 126, and 224 use an N4 Initial Association Update request to advertise their supported IP version(s) in operation 308.

In another option that uses network repository 130, flowchart 300 moves from operation 304 to operation 310, which includes, based on packet routing node 124 coming into an active state, transmitting, by packet routing node 124, to network repository 130, indication of supported IP traffic type 211. This may occur as part of a registration process. Packet routing nodes 126 and 224 may similarly advertise their supported IP traffic types in network repository 130. In operation 312, session management node 122 queries network repository 130 for indication of supported IP traffic type 211 (and 212, 213). Based on at least receiving the query, network repository 130 transmits indication of supported IP traffic type 211 (and 212, 213) to session management node 122.

Operation 320 includes receiving, by session management node 122 of wireless network 110, for packet routing node 124 of wireless network 110, indication of supported IP traffic type 211. Indication of supported IP traffic type 211 indicates support for a first IP traffic type or support for a second IP traffic type different from the first IP traffic type. In the illustrated example, indication of supported IP traffic type 211 indicates support for only IPv4. In some examples, the first IP type comprises IPv4 and/or the second IP type comprises IPv6. In some examples, the first IP type uses a 32-bit internet addresses and/or the second IP type uses an internet addresses of at least 128-bits. In some examples, the first IP type and the second IP type use different length internet addresses. ;

In some examples, wireless network 110 comprises a 5G wireless network, session management node 122 comprises an SMF, and packet routing node 124 comprises a UPF. In some examples, wireless network 110 comprises a 4G wireless network, session management node 122 comprises a PGW-C, and packet routing node 124 comprises a PGW-U. In some examples, receiving the indication of supported IP traffic type comprises receiving the indication of supported IP traffic type from packet routing node 124. In some examples, receiving the indication of supported IP traffic type comprises receiving the indication of supported IP traffic type from network repository 130.

For packet routing node 124, operation 320 also includes receiving, by session management node 122, for packet routing node 126 of wireless network 110, indication of supported IP traffic type 212. Indication of supported IP traffic type 212 indicates support for the first IP traffic type or support for the second IP traffic type. In the illustrated example, indication of supported IP traffic type 212 indicates support for only IPv6. Session management node 122 also receives indication of supported IP traffic type 213 in operation 320.

For each packet routing node 124, 126, and 224, decision operation 322 determines whether the packet routing node supports the first type of IP traffic. If so, operation 330a (part of operation 330) allocates IP addresses of the first type (e.g., IPv4). Decision operation 324 determines whether the packet routing node supports the second type of IP traffic. If so, operation 330b (also part of operation 330) allocates IP addresses of the second type (e.g., IPv6). Flowchart reaches decision operation 324 either after operation 330a or directly from a "No" result of decision operation 322. If the second IP traffic type is supported, flowchart 300 moves operation 330b, which is part of operation 330. Otherwise, decision operation 326 determines whether at least one IP address type has been allocated (e.g., the first IP traffic type). If so, flowchart 300 proceeds to operation 332. Otherwise, in some examples, since neither the first IP traffic type or the second IP traffic type has been identified as being supported, one or both IP address types will be assigned by default in operation 330. This default situation may arise if the packet routing node had not been configured to advertise its supported IP type.

In operation 330, session management node 122 allocates set 251 of IP addresses to packet routing node 124, based on at least indication of supported IP traffic type 211. Allocating set 251 of IP addresses comprises allocating only supported IP addresses and withholding allocation of unsupported IP addresses. Operation 330 also includes allocating, by session management node 122, to packet routing node 126, set 252 of IP addresses based on at least indication of supported IP traffic type 212. Allocating set 252 of IP addresses comprises allocating only supported IP addresses and withholding allocation of unsupported IP addresses. Also, in operation 330, session management node 122 allocates set 254 of IP addresses to packet routing node 224.

UE 102a requests data traffic session 106 (using the first IP type or the second IP type, based on the capabilities of UE 102a) in operation 332. In some examples, data traffic session 106 comprises a packet data session. Also in operation 332, wireless network 110 receives the request to set up data traffic session 106 for UE 102a. In operation 334, packet routing node 124 assigns IP address 216 (of set 251 of IP addresses) to UE 102a. Operation 336 includes providing, to UE 102a, using IP address 216 of set 251 of IP addresses, data traffic session 106 through packet routing node 124. This involves receiving packet data, by wireless network 110, from UE 102a, over air interface 108a, and forwarding the received packet data, by wireless network 110, to packet data network 104 or IMS 140.

Operation 338 includes receiving, by session management node 122, from packet routing node 124, a request for an additional allocation of IP addresses. Flowchart 300 returns to decision operation 322. The subsequent pass through operation 330 includes, based on receiving the request for an additional allocation of IP addresses, allocating, by session management node 122, to packet routing node 124, set 253 of IP addresses based on at least indication of supported IP traffic type 211.

Figure 4:
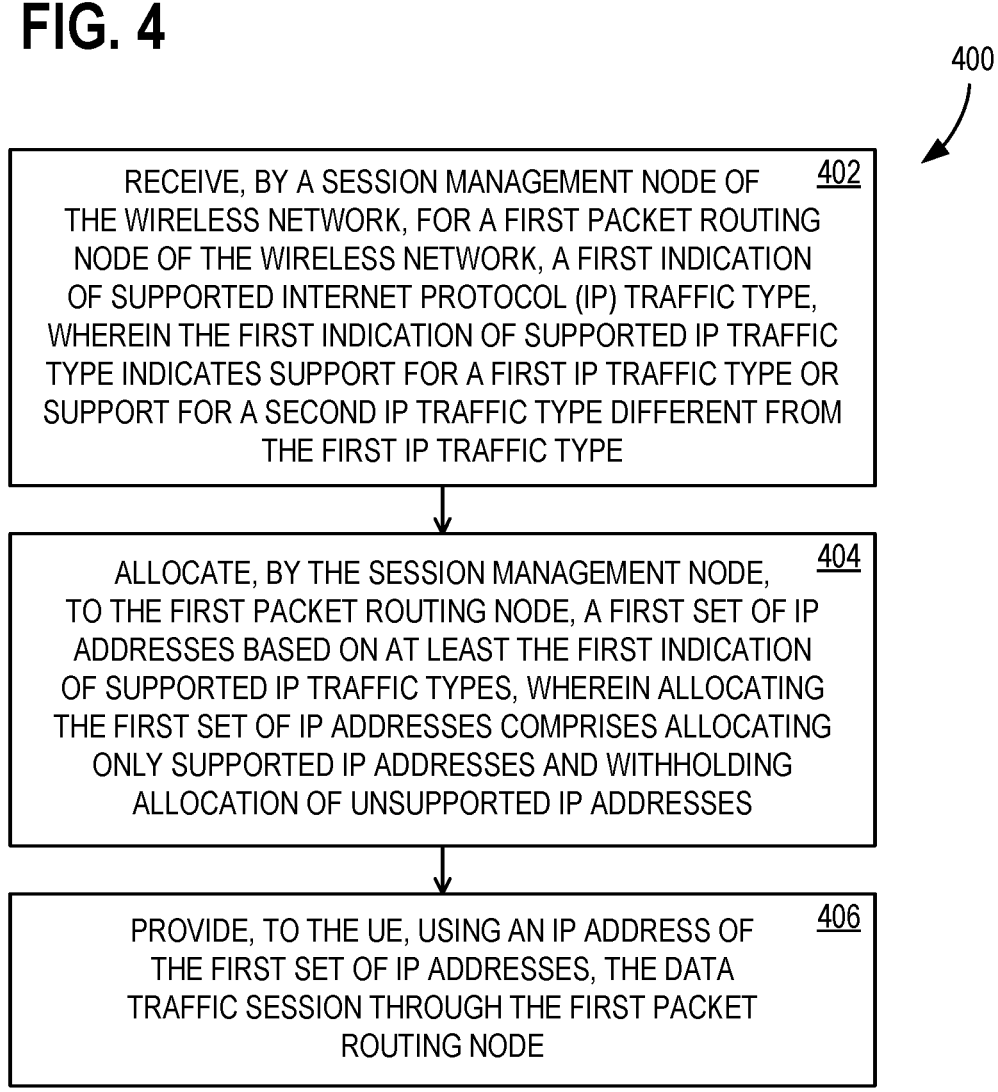
FIG. 4 illustrates another flowchart of exemplary operations associated with the arrangement of FIG. 1.

FIG. 4 illustrates a flowchart 400 of exemplary operations associated with examples of arrangement 100. In some examples, at least a portion of flowchart 400 may be performed using one or more computing devices 500 of FIG. 5. Flowchart 400 commences with operation 402, which includes receiving, by a session management node of the wireless network, for a first packet routing node of the wireless network, a first indication of supported IP traffic type, wherein the first indication of supported IP traffic type indicates support for a first IP traffic type or support for a second IP traffic type different from the first IP traffic type.

Operation 404 includes allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses. Operation 406 includes providing, to the UE, using an IP address of the first set of IP addresses, the data traffic session through the first packet routing node.

Figure 5:
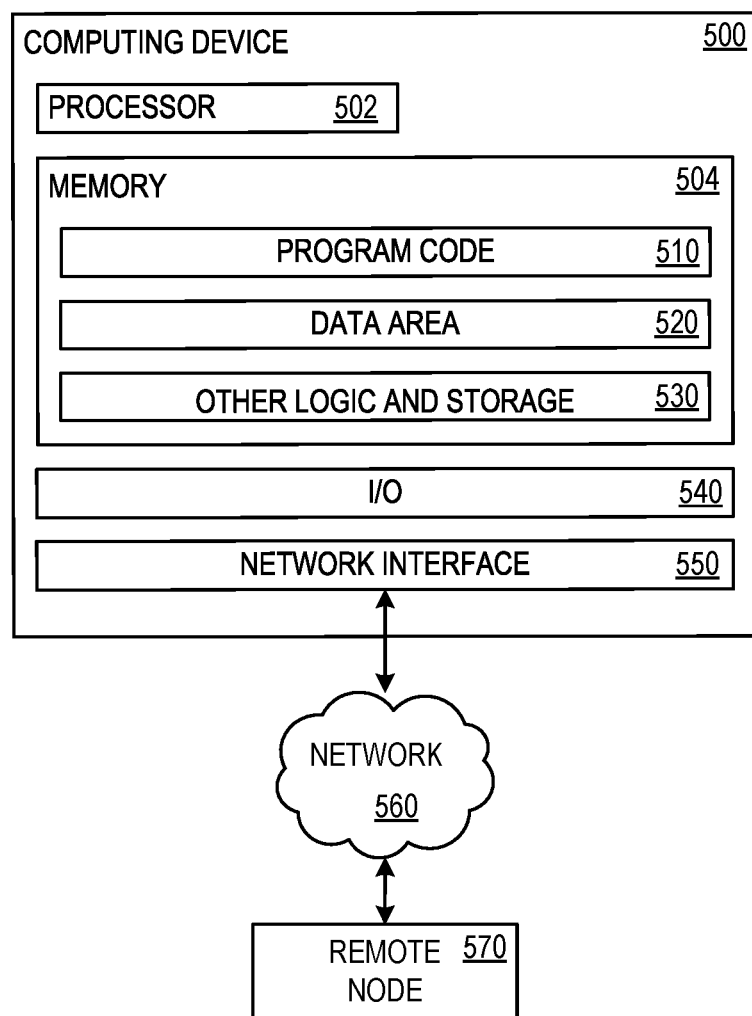
FIG. 5 illustrates a block diagram of a computing device suitable for implementing various aspects of the disclosure.

FIG. 5 illustrates a block diagram of computing device 500 that may be used as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An example method of providing a data traffic session for a UE over a wireless network comprises: receiving, by a session management node of the wireless network, for a first packet routing node of the wireless network, a first indication of supported IP traffic type, wherein the first indication of supported IP traffic type indicates support for a first IP traffic type or support for a second IP traffic type different from the first IP traffic type; allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses; and providing, to the UE, using an IP address of the first set of IP addresses, the data traffic session through the first packet routing node.

Another example method of providing a data traffic session for a UE on a wireless network comprises: receiving, by a session management node of the wireless network, for a first packet routing node, a first indication of supported IP traffic type, wherein the first indication of supported IP traffic types indicates support for a first IP traffic type, or support for a second IP traffic type, or support for both the first IP traffic type and the second IP traffic type; and allocating, by the session management node, to the first packet routing node, a set of IP addresses based on at least the first indication of supported IP traffic type, wherein allocating the set of IP addresses comprises allocating only IP addresses of a supported IP traffic type and withholding allocation of IP addresses of an unsupported IP traffic type.

An example system for providing a data traffic session for a UE on a wireless network comprises: a processor; and a computer-readable medium storing instructions that are operative upon execution by the processor to: receive, by a session management node of the wireless network, for a first packet routing node of the wireless network, a first indication of supported IP traffic type, wherein the first indication of supported IP traffic type indicates support for a first IP traffic type or support for a second IP traffic type different from the first IP traffic type; allocate, by the session management node, to the first packet routing node, a first set of IP addresses based on at least the first indication of supported IP traffic types, wherein allocating the first set of IP addresses comprises allocating only supported IP addresses and withholding allocation of unsupported IP addresses; and provide, to the UE, using an IP address of the first set of IP addresses, the data traffic session through the first packet routing node.

One or more example computer storage devices has computer-executable instructions stored thereon, which, upon execution by a computer, cause the computer to perform operations comprising: receiving, by a session management node of a wireless network, for a first packet routing node of the wireless network, a first indication of supported IP traffic type, wherein the first indication of supported IP traffic type indicates support for a first IP traffic type or support for a second IP traffic type different from the first IP traffic type; allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses; and providing, to a UE, using an IP address of the first set of IP addresses, a data traffic session through the first packet routing node.

Alternatively, or in addition to the other examples described herein, examples include any combination of the following:
- the first IP type comprises IPv4;
- the second IP type comprises IPv6;
- the session management node comprises an SMF;
- the first packet routing node comprises a UPF;
- the session management node comprises a PGW-C;
- the first packet routing node comprises a PGW-U;
- receiving the indication of supported IP traffic type comprises receiving the indication of supported IP traffic type from the first packet routing node;
- querying, by the session management node, the first packet routing node, for the first indication of supported IP traffic type;
- based on at least receiving the query, transmitting, by the first packet routing node, to the session management node, the first indication of supported IP traffic type;
- receiving the indication of supported IP traffic type comprises receiving the indication of supported IP traffic type from a network repository;
- receiving, by the session management node, for a second packet routing node of the wireless network, a second indication of supported IP traffic type;
- the second indication of supported IP traffic type indicates support for the first IP traffic type or support for the second IP traffic type;
- the second indication of supported IP traffic type indicates support for a different IP traffic type than is indicated by the first indication of supported IP traffic type;
- allocating, by the session management node, to the second packet routing node, a second set of IP addresses based on at least the second indication of supported IP traffic type;
- allocating the second set of IP addresses comprises allocating only supported IP addresses and withholding allocation of unsupported IP addresses;

receiving, by the session management node, from the first packet routing node, a request for an additional allocation of IP addresses;

based on receiving the request for an additional allocation of IP addresses, allocating, by the session management node, to the first packet routing node, a third set of IP addresses based on at least the first indication of supported IP traffic type;

the data traffic session comprises a packet data session;

the wireless network comprises a 4G wireless network;

the wireless network comprises a 5G wireless network;

requesting, by the UE, the data traffic session of the first IP type or the second IP type;

receiving, by the wireless network, a request to set up the data traffic session for the UE;

receiving packet data, by the wireless network, from the UE, over an air interface;

forwarding the received packet data, by the wireless network, to a packet data network or an IMS the first IP type uses a 32-bit internet addresses;

the second IP type uses an internet addresses of at least 128-bits;

the first IP type and the second IP type use different length internet addresses;

the network repository comprises an NRF;

receiving the indication of supported IP traffic types comprises receiving the indication of supported IP traffic types from the first packet routing node in an Association Update message;

based on the first packet routing node coming into an active state, transmitting, by the first packet routing node, to the session management node, the first indication of supported IP traffic types; and based on the first packet routing node coming into an active state, transmitting, by the first packet routing node, to the network repository, the first indication of supported IP traffic types.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session for a user equipment (UE) over a wireless network, the method comprising:

receiving, by a session management node of the wireless network, for a first packet routing node of the wireless network, a first indication of supported internet protocol (IP) traffic type, wherein the first indication of supported IP traffic type indicates support for a first IP traffic type or support for a second IP traffic type different from the first IP traffic type;

allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses;

providing, to the UE, using an IP address of the first set of IP addresses, the data traffic session through the first packet routing node;

receiving, by the session management node, from the first packet routing node, a request for an additional allocation of IP addresses; and based on receiving the request for an additional allocation of IP addresses, allocating, by the session management node, to the first packet routing node, a second set of IP addresses based on at least the first indication of supported IP traffic type.

2. The method of claim 1, wherein the first IP traffic type comprises IPv4 and the second IP traffic type comprises IPv6, and wherein the session management node comprises a session management function (SMF) and the first packet routing node comprises a user plane function (UPF), or the session management node comprises a packet data network gateway (PGW)-control plane (PGW-C) and the first packet routing node comprises a PGW-user plane (PGW-U).

3. The method of claim 1, wherein receiving the first indication of supported IP traffic type comprises receiving the first indication of supported IP traffic type from the first packet routing node.

4. The method of claim 3, further comprising:

querying, by the session management node, the first packet routing node, for the first indication of supported IP traffic type; and based on at least receiving the query, transmitting, by the first packet routing node, to the session management node, the first indication of supported IP traffic type.

5. The method of claim 1, wherein receiving the first indication of supported IP traffic type comprises receiving the first indication of supported IP traffic type from a network repository.

6. The method of claim 1, further comprising:

receiving, by the session management node, for a second packet routing node of the wireless network, a second indication of supported IP traffic type, wherein the second indication of supported IP traffic type indicates support for the first IP traffic type or support for the second IP traffic type, and wherein the second indication of supported IP traffic type indicates support for a different IP traffic type than is indicated by the first indication of supported IP traffic type; and allocating, by the session management node, to the second packet routing node, a third set of IP addresses based on at least the second indication of supported IP traffic type, wherein allocating the third set of IP addresses comprises allocating only supported IP addresses and withholding allocation of unsupported IP addresses.

7. A system for providing a data traffic session for a user equipment (UE) over a wireless network, the system comprising:
a processor; and
a computer-readable medium storing instructions that are operative upon execution by the processor to:
receive, by a session management node of the wireless network, for a first packet routing node of the wireless network, a first indication of supported internet protocol (IP) traffic type, wherein the first indication of supported IP traffic type indicates support for a first IP traffic type or support for a second IP traffic type different from the first IP traffic type;
allocate, by the session management node, to the first packet routing node, a first set of IP addresses based on at least the first indication of supported IP traffic types, wherein allocating the first set of IP addresses comprises allocating only supported IP addresses and withholding allocation of unsupported IP addresses;
provide, to the UE, using an IP address of the first set of IP addresses, the data traffic session through the first packet routing node;
receive, by the session management node, from the first packet routing node, a request for an additional allocation of IP addresses; and
based on receiving the request for an additional allocation of IP addresses, allocate, by the session management node, to the first packet routing node, a second set of IP addresses based on at least the first indication of supported IP traffic type.

8. The system of claim 7, wherein the first IP traffic type comprises IPv4 and the second IP traffic type comprises IPv6, and
wherein the session management node comprises a session management function (SMF) and the first packet routing node comprises a user plane function (UPF), or the session management node comprises a packet data network gateway (PGW)-control plane (PGW-C) and the first packet routing node comprises a PGW-user plane (PGW-U).

9. The system of claim 7, wherein receiving the first indication of supported IP traffic type comprises receiving the first indication of supported IP traffic type from the first packet routing node.

10. The system of claim 9, wherein the instructions are further operative to:
query, by the session management node, the first packet routing node, for the first indication of supported IP traffic type; and
based on at least receiving the query, transmit, by the first packet routing node, to the session management node, the first indication of supported IP traffic type.

11. The system of claim 7, wherein receiving the first indication of supported IP traffic type comprises receiving the first indication of supported IP traffic type from a network repository.

12. The system of claim 7, wherein the instructions are further operative to:
receive, by the session management node, for a second packet routing node of the wireless network, a second indication of supported IP traffic type, wherein the second indication of supported IP traffic type indicates support for the first IP traffic type or support for the second IP traffic type, and wherein the second indication of supported IP traffic type indicates support for a different IP traffic type than is indicated by the first indication of supported IP traffic type; and
allocate, by the session management node, to the second packet routing node, a third set of IP addresses based on at least the second indication of supported IP traffic type, wherein allocating the third set of IP addresses comprises allocating only supported IP addresses and withholding allocation of unsupported IP addresses.

13. One or more computer storage devices having computer-executable instructions stored thereon, which, upon execution by a computer, cause the computer to perform operations comprising:
receiving, by a session management node of a wireless network, for a first packet routing node of the wireless network, a first indication of supported internet protocol (IP) traffic type, wherein the first indication of supported IP traffic type indicates support for a first IP traffic type or support for a second IP traffic type different from the first IP traffic type;
allocating, by the session management node, to the first packet routing node, a first set of IP addresses based on at least the first indication of supported IP traffic types, wherein allocating the first set of IP addresses comprises allocating only supported IP addresses and withholding allocation of unsupported IP addresses;
providing, to a user equipment (UE), using an IP address of the first set of IP addresses, a data traffic session through the first packet routing node;
receiving, by the session management node, from the first packet routing node, a request for an additional allocation of IP addresses; and
based on receiving the request for an additional allocation of IP addresses, allocating, by the session management node, to the first packet routing node, a second set of IP addresses based on at least the first indication of supported IP traffic type.

14. The one or more computer storage devices of claim 13, wherein the first IP traffic type comprises IPv4 and the second IP traffic type comprises IPv6, and
wherein the session management node comprises a session management function (SMF) and the first packet routing node comprises a user plane function (UPF), or the session management node comprises a packet data network gateway (PGW)-control plane (PGW-C) and the first packet routing node comprises a PGW-user plane (PGW-U).

15. The one or more computer storage devices of claim 13, wherein receiving the first indication of supported IP traffic type comprises receiving the first indication of supported IP traffic type from the first packet routing node.

16. The one or more computer storage devices of claim 15, wherein the operations further comprise:
querying, by the session management node, the first packet routing node, for the first indication of supported IP traffic type; and
based on at least receiving the query, transmitting, by the first packet routing node, to the session management node, the first indication of supported IP traffic type.

17. The one or more computer storage devices of claim 13, wherein receiving the first indication of supported IP traffic type comprises receiving the first indication of supported IP traffic type from a network repository.

18. The one or more computer storage devices of claim 13, wherein the operations further comprise:
receiving, by the session management node, for a second packet routing node of the wireless network, a second indication of supported IP traffic type, wherein the second indication of supported IP traffic type indicates support for the first IP traffic type or support for the second IP traffic type, and wherein the second indication of supported IP traffic type indicates support for a different IP traffic type than is indicated by the first indication of supported IP traffic type; and allocating, by the session management node, to the second packet routing node, a third set of IP addresses based on at least the second indication of supported IP traffic type, wherein allocating the third set of IP addresses comprises allocating only supported IP addresses and withholding allocation of unsupported IP addresses.

* * * * *